United States Patent Office 2,725,394
Patented Nov. 29, 1955

2,725,394

PRODUCTION OF ESTERS OF ORTHOPHOSPHORIC ACID AND SALTS THEREOF

Henryk Zenftman, Saltcoats, and Edward Whitworth, West Kilbride, Scotland, assignors to Imperial Chemical Industries Limited, a corporation of Great Britain No Drawing. Application July 9, 1951,
Serial No. 235,903

Claims priority, application Great Britain August 3, 1950

4 Claims. (Cl. 260—461)

The present invention is concerned with the production of new primary alkaryl esters of phosphoric acid and their salts, namely para-tertiary octyl-phenyl and -cresyl dihydrogen phosphate and their corresponding salts of the alkali metals and of monovalent non-metallic bases.

It is found that it is not possible to produce para-tertiary octyl-phenyl and -cresyl dihydrogen phosphates in substantially pure and non-deliquescent form simply by effecting the hydrolysis of para-tertiary octyl-phenoxy and -cresoxy phosphoryl dichlorides respectively simply by treating these dichlorides with water. Any such procedure leads to impure and deliquescent products and this is presumed to be due to the formation of para-tertiary octyl-phenol or para-tertiary octyl-cresol, as the case may be, as well as to the formation of free phosphoric acid.

According to the present invention the process for the production of para-tertiary octyl-phenyl and -cresyl dihydrogen phosphates comprises gradually adding 2 mols of water to 1 mol of para-tertiary octyl-phenoxy or -cresoxy phosphoryl dichloride at a reaction temperature, removing the hydrogen chloride formed and keeping the reaction mixture fluid until the reaction is completed.

It will be understood that in carrying out the invention it will usually be necessary to add a slight excess of water in order to compensate for losses due for example to evaporation.

The para-tertiary octyl-phenyl dihydrogen phosphate thus obtained is a white non-hygroscopic crystalline substance with a fusion temperature of about 115° C. On recrystallisation from ligroin it forms white crystals having a melting point of 125° C.

A mixture of its mono-methyl homologues obtained as a derivative of commercial cresol is a transparent viscous syrup in the dry state.

These primary esters are particularly suitable in froth flotation operations as collecting agents for a number of mineral ores. They float for example fluorspar, barytes, calcite, chromite and ilmenite but not quartz.

They are also particularly useful as frothing agents if a light foam is required and have the special advantage of retaining their foaming properties throughout a range of acidity of the aqueous medium in which they are used, extending to a pH as low as 1.0, while in the form of their aforementioned salts they exhibit foaming properties at a pH range extending upwards to a pH of approximately 8.0. The acid esters are capable of solution in water and exhibit their foaming properties in quite small concentrations for example 0.05 to 0.5%. In preparing their aqueous solutions it is most convenient to dissolve the compound in hot water and then dilute the solution with cold water. Their concentrated aqueous solutions resemble soap solutions in showing evidence of micellar structure. The acid esters obtained according to the present invention are readily soluble in acetone, and ethyl alcohol, and to a greater or lesser extent also in toluene, xylene and other aromatic and aliphatic hydrocarbons. They are substantially non-volatile and cannot be distilled.

These acid esters in small concentrations have also the valuable property of anti-corrosives for ferrous metals and also for various non-ferrous metals, especially when associated with the presence of an oil.

In order to convert the acid ester into its salts there may be mixed with the molten ester under conditions of cooling an aqueous solution of a base e. g. sodium hydroxide, in just sufficient water to enable the resulting solution of the salt to be obtained in the form of a paste. It will be understood that if this salt is to be used as a frothing agent a predetermined quantity of sodium hydroxide should be used so as to obtain the required pH. The aqueous solutions of said salts besides exhibiting foaming properties in neutral and only slightly alkaline solutions also confer surface anti-slipping properties when a thin invisible film is allowed to evaporate on a smooth surface for example of metals, glass, tiles, or other smooth materials. Solutions of very low concentrations are sufficient to bring about this effect which is useful for coating artificial fibres for spinning and for treatment of smooth flooring materials.

In carrying out the hydrolysis of the para-tertiary octyl-phenoxy- or para-tertiary octyl-cresoxy-phosphoryl dichloride, it is advisable to pass through the reaction medium a stream of an indifferent gas e. g. nitrogen, air or carbon dioxide so as to assist the removal of the hydrogen chloride, and mechanical stirring may advantageously be applied in addition so as to facilitate the distribution of each drop of water throughout the dichloride. At the beginning the reaction mixture is preferably maintained at a temperature of 85° to 90° C., but as the reaction progresses it may become necessary to raise the temperature above the boiling point of water, and towards the end of the reaction the temperature may advantageously be 120° to 140° C. so as to retain the formed product above its melting point.

The invention is illustrated in the following examples in which the parts are parts by weight except where otherwise indicated.

*Example 1*

To 1 mol of heated para-tertiary octyl-phenoxy-phosphoryl dichloride (boiling point 142° C. at 0.8 mm., 190–192° C. at 10 mm.) contained in a vessel provided with a stirrer and reflux condenser fitted with a lead-away tube for the gas evolved, there is gradually added through a dropping funnel 2.1 mols water, the vessel being heated by means of an oil bath and the temperature of the contents being maintained at the start at 85° to 90° C. and gradually raised as the reaction progresses so as to keep the contents of the vessel liquid, the reaction mixture being continuously stirred. The water is added drop-wise over a period of approximately 6 hours and care is taken to ensure that no aqueous layer accumulates. Towards the end of the reaction the temperature in the bath is 140° C. Heating is continued at this temperature under a pressure of 12 mm. in order to remove the last traces of hydrogen chloride. The liquid contents of the vessel are then poured on to aluminium trays and left to solidify. The resulting para-tertiary octyl-dihydrogen orthophosphate sets at a temperature slightly below 115° C. forming a nearly white non-hygroscopic crystalline product having a slight pink tint. It contains about 1% of foreign matter. The compound is crystallised from hot ligroin, from which it gives colourless acicular crystals of orthorhombic system with a melting point of 125° C. Elementary analysis gives P=10.97%; C=57.7%; H=8.0% (calculated for $C_{14}H_{23}PO_4$, P=10.84%; C=58.04%; H=8.04%). The compound is soluble in acetone, ether, chloroform, methyl alcohol, ethyl alcohol and benzene. 1 gm. of the product dissolved in 50 cc. of hot water forms an opaque solution of soapy appearance which foams profusely on shaking. The solution is diluted in 500 cc. of cold water and this diluted solution on shaking forms a profuse foam which can be maintained for several hours. Addition of 5 cc. N/1 hydrochloric or sulphuric acid to the solution has no effect on its foaming power.

The interfacial tension between aqueous solutions of different concentrations of para-tertiary octyl-phenyl dihydrogen phosphate as prepared in Example 1 and fluid media consisting respectively of air and medicinal liquid paraffin, in each case at 20.2° C., are determined by examining photographically the contour of drops of said aqueous solutions suspended in the fluid media from a capillary and are recorded as follows:

| Concentration of solution | Fluid medium | Tension in dynes per cm. |
|---|---|---|
| 0% (water) | air | 60.3 |
| 0.2% | do | 27.31 |
| 1.0% | do | 25.60 |
| 0% | paraffin | 45.40 |
| 0.2% | do | 3.64 |
| 1.0% | do | 1.36 |

*Example 2*

To 1 mol para-tertiary octyl-cresoxy-phosphoryl dichloride (boiling point 146 at 0.3 mm. pressure) obtained by heating para-tertiary octyl-cresol with an excess of phosphorus oxychloride in presence of metallic iron catalyst, there are added 2.1 mols water in the manner described in Example 1.

The resulting product is a straw coloured viscous liquid possessing similar solubility characteristics as the product described in Example 1 and exhibiting generally similar surface active properties.

What we claim is:

1. In a process for the production of a para-tertiary octyl-aryl dihydrogen phosphate in which said aryl group is selected from the group consisting of phenyl and cresyl groups by hydrolysis of the corresponding para-tertiary octyl-aryl dichloride phosphate and removing the hydrogen chloride formed during the reaction while keeping the reaction mixture fluid until the reaction is complete, the improvement which comprises gradually adding 2 mols of water to 1 mol of said dichloride while keeping the temperature of the reaction mixture at the beginning of the reaction at 85° to 90° C., and subsequently allowing the reaction mixture to reach a temperature of 120° to 140° C.

2. A process as claimed in claim 1 wherein a stream of an indifferent gas is passed through the reaction mixture.

3. A process as claimed in claim 2 wherein the indifferent gas is selected from the group consisting of nitrogen, air and carbon dioxide.

4. A process as claimed in claim 2 wherein the reaction mixture is mechanically stirred.

References Cited in the file of this patent

UNITED STATES PATENTS

| | | |
|---|---|---|
| 1,960,184 | Guggenheim | May 22, 1934 |
| 2,071,017 | Bass | Feb. 16, 1937 |
| 2,071,323 | Bass | Feb. 23, 1937 |
| 2,073,316 | Niederl | Mar. 9, 1937 |
| 2,479,939 | Kosolapoff | Aug. 23, 1949 |
| 2,504,165 | Toy | Apr. 18, 1950 |